United States Patent [19]

Timmerman et al.

[11] 3,950,169

[45] Apr. 13, 1976

[54] ELECTROPHOTOGRAPHIC ELEMENT WITH POLYMERIC CONDUCTIVE LAYER

[75] Inventors: Daniel Maurice Timmerman, Mortsel; Walter Frans De Winter, Berchem, both of Belgium

[73] Assignee: AGFA-GEVAERT N.V., Mortsel, Belgium

[22] Filed: Jan. 3, 1975

[21] Appl. No.: 538,260

Related U.S. Application Data

[62] Division of Ser. No. 323,420, Jan. 15, 1973, Pat. No. 3,864,158.

[30] Foreign Application Priority Data

Jan. 17, 1972  United Kingdom.................. 2134/72

[52] U.S. Cl. ........................... 96/1.5; 96/1.8; 96/85; 96/87 A; 96/1.6; 96/1.7
[51] Int. Cl.² ......................................... G03G 5/04
[58] Field of Search ................. 96/1.5, 1.6, 1.7, 1.8, 96/85, 87 A; 162/138, 169

[56] References Cited
UNITED STATES PATENTS

| | | | |
|---|---|---|---|
| 3,155,503 | 11/1964 | Cassiers et al. ......................... | 96/1.5 |
| 3,293,115 | 12/1966 | Lucken .................................. | 96/1.5 X |
| 3,544,318 | 12/1970 | Boothe et al. .......................... | 96/1.5 |
| 3,640,766 | 2/1972 | Jursich et al. ......................... | 96/1.5 X |
| 3,708,289 | 1/1973 | Timmerman et al. .............. | 96/1.5 X |
| 3,804,668 | 4/1974 | Bakule et al. ......................... | 96/1.8 X |

*Primary Examiner*—Roland E. Martin, Jr.
*Attorney, Agent, or Firm*—William J. Daniel

[57]  ABSTRACT

A recording material is described, which comprises a support of paper or of synthetic polymer and an electroconductive layer on at least one side of the support. The surface resistance of this electroconductive layer is not more than $10^{11}$ ohms per sq. at a relative humidity of 15%. The layer consists or includes a major proportion of a water-soluble polymer resulting from the amino alkylation of polyethyleneimine with an epoxy compound bearing a quaternary ammonium end group.

The electroconductive layers may be used as antistatic layers in a photographic silver halide recording material. When covered with a photoconductive coating the electroconductive layer may be used in electrophotographic recording materials. When an insulating layer is applied on the electroconductive layer an electrographic recording material is formed.

4 Claims, No Drawings

ELECTROPHOTOGRAPHIC ELEMENT WITH POLYMERIC CONDUCTIVE LAYER

This is a division, of Ser. No. 323,420, filed Jan. 15, 1973, now U.S. Pat. No. 3,864,158.

The invention relates to a recording material comprising a support of paper or of synthetic polymer, at least one surface of which is coated with a layer that may function as an electroconductive or as an antistatic layer.

Electroconductive products are used in recording materials to carry off static charges. For instance, it is known that in normal photographic silver halide emulsion materials the usual synthetic film supports possess the property of being charged electrostatically, whereby the charged films strongly attract the surrounding dust and thereby become soiled at their surface. Moreover, latent discharge images on silver halide emulsions, which are applied to such film supports, become visible upon development. Such an electrostatic charging is caused by quickly moving the film support of light-sensitive photographic material during rolling or unrolling in the coating, cutting, or packing machines and by making the film run through the camera and the projector. It is also known that the static charging can be reduced by coating the synthetic resin support with a conductive auxiliary layer.

In other recording materials such as for use in electrostatic printing an electrostatic charge is imparted to paper or other dielectric support in a predetermined pattern. The support is conductive or must be coated with a conductive layer. For instance, in an electrophotographic recording element a photoconductive layer stands in contact with an electroconductive layer or sheet, the latter being present for carrying off the electrostatic charges at the areas of the photoconductive layer undergoing an exposure to light rays.

In electrographic materials comprising an insulating layer whereon an electrostatic charge pattern is built up by image-wise or record-wise charging, e.g. by means of a modulated electron beam, the conductive element (support or layer) serves to apply a voltage thereto, thus making possible the formation of the electrostatic charge pattern applied to the insulating top layer.

In the following description and claims the general term "recording material" is intended to include the materials used in photographic processes and in electrographic and electrophotographic processes for which applications the surface resistance of the electroconductive layer must not be higher than $10^{11}$ ohms per sq. at 15% of relative humidity, although according to Nakao, Sakomoto and Katagiri at page 105 of the Preprints of the Tappi First Reprography Conference at St. Charles, Ill., U.S.A., 1971, slight smudging of the back face of the support might already occur at resistance values higher than $4 \times 10^{10}$ ohms/sq.

Electroconductive layers for carrying off electrostatic charges may also be useful in recording elements wherein photosensitive semiconductor compounds are activated reversely by electromagnetic radiation and wherein the activated patterns provide irreversible images by an oxidation-reduction chemical process.

The invention provides a recording material comprising a support of paper or of synthetic polymer, an electroconductive layer on at least one side of said support, said layer having a surface resistance not more than $10^{11}$ ohms per sq. at a relative humidity of 15%, the said electroconductive layer consisting of or including a major proportion of a water-soluble polymer resulting from the amino alkylation of polyethyleneimine with an epoxy compound bearing a quaternary ammonium end group.

The epoxy compounds bearing a quaternary ammonium end group correspond to the general formula:

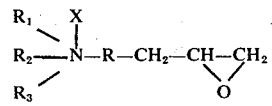

wherein:

R represents a branched or unbranched alkylene group having up to 4 carbon atoms, each of $R_1$, $R_2$, and $R_3$ (same or different) represents an alkyl group containing up to 4 carbon atoms, a cycloalkyl group or an aralkyl group, or $R_1$, $R_2$, and $R_3$ together with the nitrogen atom represent a heterocyclic amine group such as in pyridine, piperidine, and morpholine, and X represents an anion, e.g. a halogen atom such as chlorine, bromine, and iodine, a sulphate group, a methylsulphate group, a p-tolylsulphonate group, an acetate group and the like.

In fact, the anion X may derive from any suitable acid. For ease of manufacture and especially in view of its better electrical conductivity, the chloride is preferred.

Suitable epoxy compounds bearing a quaternary ammonium end group e.g. N-trimethyl-N-glycidyl-ammonium chloride, N-triethyl-N-glycidyl-ammonium chloride and N-triethyl-N-glycidyl-ammonium p-toluene sulphonate.

These epoxy compounds bearing a quaternary ammonium end group can directly be obtained by making an epoxy compound of the formula:

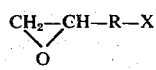

react with a tertiary amine of the formula:

as described by Paquin in "Epoxyverbindungen und Epoxyharze", Springer Verlag (1958), p. 202. In these formulae X, R, $R_1$, $R_2$, and $R_3$ have the same significances as indicated above.

Preferably epichlorohydrin is used, although other compounds bearing an epoxy group may also be applied, e.g. 1-chloro-3,4-epoxy-butane, 1-chloro-1-methyl-2,3-epoxy-propane, and 1-chloro-2-methyl-3,4-epoxy-butane.

A preferred tertiary amine is trimethylamine.

The epoxy compounds bearing a quaternary ammonium end group can also be obtained in two reaction steps. In a first step glycidyl amines are formed as described by Gilman and Fullhart in J. Am. Chem. Soc. 71, 1478 (1949). For example a secondary amine is made to react with epichlorohydrin:

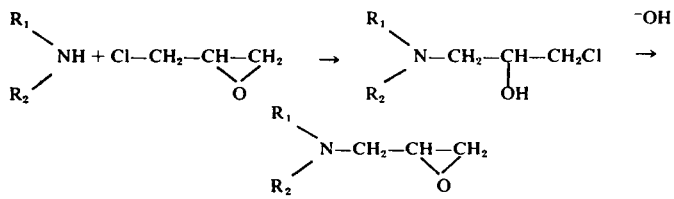

In a second reaction step the glycidyl-amine is alkylated to form the epoxy compound bearing a quaternary ammonium end group:

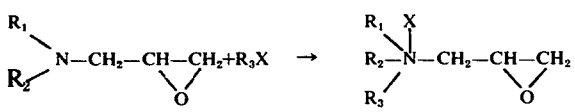

as described by Burness and Bayer in J. Org. Chem., 28, 2283–8 (1963).

The alkylating agent R₃X may be selected from the alkyl sulfonates, sulfates, halides or the like.

The amino alkylation of polyethyleneimine with an epoxy compound bearing a quaternary ammonium end group preferably occurs in aqueous medium at relatively low temperatures, e.g. at about 50°C, the concentration of both polyethyleneimine and epoxy compound in the aqueous medium being as high as possible. At these low temperatures and high polymer and epoxy concentrations the hydrolysis of the epoxy group is reduced to a minimum.

Further, when a high degree of substitution on the amino groups of polyethyleneimine is desired, it is necessary that all the reactive amino groups will be in the form of free amino units, and not in form of a salt.

When the aminoalkylation of polyethyleneimine occurs in organic medium, e.g. in dimethylformamide, there is no fear the the epoxy groups might be hydrolysed. Thus the temperature in the reaction mixture can be much higher, e.g. above 100°C.

It is generally known that the polymerisation of ethyleneimine does not result in a polymer that is completely composed of units having a linear structure, but that also a certain degree of branching is found. According to Zhuk, Gembitskii, and Kargin in Russian Chem. Rev., 34 (July 1965) No. 7, page 523, the degree of branching in polyethyleneimine depends on the acid concentration and the temperature during polymerisation. This degree of branching may vary between 12 and 38%. The formula of polyethyleneimine can be represented as follows:

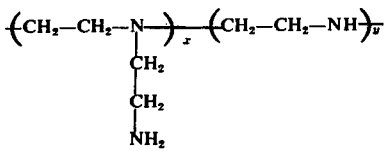

wherein, depending on the degree of branching, x is comprised between 13.6 and 61.3 mole % and y between 38.7 and 86.4 mole %.

As appears from the above formula polyethyleneimine comprises primary and secondary amino groups. When the polyethyleneimine is made to react with the epoxy compound bearing a quaternary ammonium end group, probably the first substitutions will occur with one hydrogen atom of the primary amino groups whereby a secondary amino group is formed. Further substitutions occur on the thus formed secondary amino groups as well as on the secondary amino groups belonging to the main polymer chain. Depending on the ratio of epoxy compound bearing a quaternary ammonium end group with respect to the polyethyleneimine present, the primary amino groups or the primary and secondary amino groups of the ethyleneimine units in the polymer may be amino alkylated partly or completely.

The aminoalkylation products of polyethyleneimine as described in the invention present great advantages. No by-products are formed during the reaction, so that the aminoalkylated polyethyleneimine need not be separated from the reaction mixture and no further purification is necessary. The reaction mixture can be used as such, which is very economical.

The electroconductive polymers of the invention comprise recurring units corresponding to the general formula:

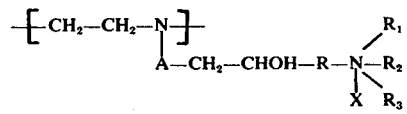

wherein A represents a single chemical bond or a group of the formula:

wherein R₄ represents a hydrogen atom or a group of the formula

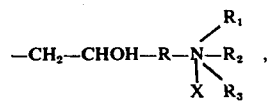

X, R, R₁, R₂, and R₃ having the same significances as indicated above.

The molecular weight of the polyethyleneimine before amino alkylation with the epoxy compound bearing a quaternary end group, has little effect on the electroconductive properties of the polymers after amino alkylation. However, the molecular weight does affect the viscosity of the aqueous coating containing the amino alkylated polyethyleneimine. Thus, the choice of the molecular weight of the material to be used is determined by the desired final viscosity. It results from our experiments that polyethyleneimines with molecular weights ranging from 1200 to about 50,000 can be amino alkylated and that continuous layers of these amino alkylated polyethyleneimines can be applied to a support without any operational difficulties.

The electroconductivity of the amino-alkylated polyethyleneimines of the invention is proportional, of course, to the substitution degree of the amino groups in the polymer, to the quantity of amino/alkylated polymer present per unit of surface, and on the relative humidity of the layer. It was found that, at 15% of relative humidity and about 20°C with polyethyleneimine wherein 10% of the primary and secondary amino groups have been substituted with N-ethyl-N-glycidyl-ammonium chloride, it was necessary to apply at least 2 g/sq.m to obtain a layer with a surface resistance lower than the $10^{11}$ ohm/sq. as indicated above. However, when only 1.5 g/sq.m is applied, it is necessary to use polyethyleneimines having a substitution degree of at least 20%. Of course the substitution degree may be much higher and amount to about 100% whereby a corresponding improvement of the electroconductivity will be obtained.

The electroconductive polymers of the invention are soluble in water. Their electroconductivity is determined by measuring the surface resistance of layers applied to a support from a 10% aqueous solution of the polymer. The resulting layer is dried and conditioned at a specific relative humidity. The surface resistance measurements are performed by means of a cell, both poles of which have a width of 0.5 cm and are at a distance of 1 cm from each other.

These layers can only be used as an electroconductive layer in an electrographic recording element, when its surface resistance does not exceed well defined limits. The article of Nakao et al., indicated above, cites a value of $4 \times 10^{10}$ ohm/sq. as a limit for smudging of the back face of the paper support. The electroconductivity itself, however, is influenced by the degree of relative humidity. Thus it is advisable to measure a value of surface resistance at 15% of relative humidity not higher than $10^{11}$ ohms/sq. In such case a slight backmarking is unavoidable when the relative humidity is very low. The image, however, retains sufficient appeal to be commercially acceptable.

Layers of the electroconductive polymeric materials can be applied by spray, brush, roller, doctor blade, air brush, or wiping technique to different kinds of supports, e.g. paper. Films of synthetic polymers such as cellulose acetate, polystyrene, polyester, polycarbonate, can also be coated with the electroconductive layers. If necessary, these film supports can be provided previously with a known subbing layer, whereon the electroconductive layer is coated afterwards.

The amount of electroconductive polymeric material applied depend, of course, on the support used. When this support is made of paper and especially of a highly porous paper stock, more electroconductive polymeric material will have to be applied than in the case of a nonporous synthetic support, e.g., of polyester. In general, however, an amount of 0.5 to 7.5 g/sq.m suffices to provide the layer with a good conductivity.

When paper is used as the support, the electroconductive polymeric materials will also impart electroconductivity when the paper is thoroughly soaked with an aqueous solution of the electroconductive polymeric materials of the invention. After drying of the thus impregnated paper, the electroconductive polymeric material remains dispersed throughout the entire paper base. Electroconductivity may also be conferred to the paper base by adding a sufficient quantity of an aqueous solution of the electroconductive polymeric materials to the papermaking pulp. The amount of incorporated conductive polymer is determined by the required degree of conductivity.

In addition to the electroconductive polymer of the invention the composition of the electroconductive layer may include stabilizing agents against migrating forces, plasticizers, dispersing agents, pigments, and binders such as gelatin, starch, casein, polyvinyl alcohol and the like. It is obvious that the admixture of such binders determinedly influences the electroconductivity of the layer. Especially polyvinyl alcohol and gelatin are found to lower the electroconductivity of the layer much more than e.g. starch, as commonly can be found in the literature.

Moreover, the electroconductive polymers of the invention may also be combined with minor amounts, in comparison to the amount of electroconductive polymer present, of inorganic and organic salts, e.g. sodium chloride, sodium sulphate, sodium nitrate, the corresponding potassium and ammonium salts, sodium acetate, citric acid amides, hydroxypropylsucrose monolaurate, etc. These salts are known to be electroconductive. They are inexpensive but have the disadvantage that their electroconductivity is very dependent on the relative humidity. When they are combined with the electroconductive polymers of the invention, the low cost-price of these salts is linked with the excellent electroconductivity at low and high relative humidities of the electroconductive polymers.

When the electroconductive layer of the invention is to be used as an antistatic layer in a photographic silver halide recording material, the electroconductive layer is applied generally to the said sheet or web either on a surface opposite to the surface to which the light-sensitive emulsion layer said polymer is applied, or as an interlayer, i.e. between the support and the light-sensitive emulsion layer or layers.

If the electroconductive layer is to be used in an electrophotographic recording material, a photoconductive coating is applied to the said polymer layer. This coating is prepared by dispersing or dissolving the photoconductive substance or substances in an organic solution of an insulating binder and by applying the dispersion or solution in the form of a layer to the electroconductive surfaces.

The electrophotographic recording element prepared with the electroconductive copolymer of the present invention is flexible and possesses a very good mechanical strength. A very good adhesion exists between the paper support and the electroconductive layer.

The electroconductive polymers may be used in combination with coatings of various inorganic as well as organic photoconductive substances such as those described in the Belgian Pat. No. 587,300 filed Feb. 5, 1960 by Gevaert Photo-Producten N.V., the United Kingdom Pat. Specifications No. 964,871 filed Feb. 26, 1959, 964,873 and 964,874 both filed Mar. 30, 1960, 964,875 and 964,876 both filed Apr. 21, 1960, 964,877 filed May 2, 1960, 964,879 filed Apr. 26, 1960, 970,937 filed Dec. 9, 1960, 980,879 and 980,880 both filed Feb. 17, 1961 all by Gevaert Photo-Producten N.V., in the German Pat. No. 1,058,836 filed Apr. 14, 1956 by Kalle & Co. A. G. and in the Canadian Pat. No. 568,707 of Kalle & Co. A. G., issued Jan. 6, 1959. These photoconductive substances may be combined with insulating binder agents, known i.a. from the U.S. Pat. No. 2,197,552 of Joseph N. Kuznick, issued Apr. 16, 1940, 2,297,691 of Chester F. Carlson, issued Oct. 6, 1942, 2,485,589 of Frank Graz, issued Oct. 25, 1949, 2,551,582 of Chester F. Carlson, issued May 8, 1951 and 2,599,542 of Chester F. Carlson, issued June 10, 1952, from the United Kingdom Pat. Specifications No. 566,278 filed June 21, 1943 by Rothschild S. Slathodeon Ltd., 693,112 filed May 9, 1950 by Battelle Development Corporation and 700,502 filed Apr. 26, 1949 by Office National D'Etudes et de Recherches Aéronautiques, from the Belgian Pat. No. 612,102 filed Dec. 29, 1961 by Gevaert Photo-Producten N.V., 711,376 filed Feb. 28, 1968 by Gevaert-Agfa N.V. and 714,257 filed Apr. 26, 1968 by Gevaert-Agfa N.V., the French Pat. No. 1,485,839 filed June 24, 1966 by Gevaert-Agfa N.V. and the Belgian Pat. No. 683,145 filed June 27, 1966 by Gevaert-Agfa N.V.

Suitable dispersing agents for dispersing photoconductive materials in an aqueous medium are described in the Belgian Pat. No. 703,467 filed Sept. 5, 1967 by Gevaert-Agfa N.V. and as is generally known the photoconductive substances can be spectrally sensitized as described in the Belgian Pat. No. 708,244 filed Dec. 20, 1967 by Gevaert-Agfa N.V. and in the Belgian Pat. No. 714,258 filed Apr. 26, 1968 by Gevaert-Agfa N.V.

The description and claims of the present invention are restricted to the aminoalkylation of poly-ethyleneimine with epoxy compounds bearing quaternary ammonium end groups. The same aminoalkylation can also be applied to other known polymers containing primary and/or secondary amino groups such as polyvinylamine, polyvinylaniline, polycyclodialkylamines, polyvinylimidazole and polyvinyltetrahydropyrimidine, whereby also electroconductive polymers are obtained.

The invention is illustrated by the following examples.

EXAMPLE 1

A solution of 43 g of polyethyleneimine in 41 g of water was introduced in a flask provided with a stirrer, a reflux condenser, a dropping funnel, and a thermometer. The solution was heated to 50°C.

The polyethyleneimine had a branching degree of about 30%, which corresponds with the following general formula:

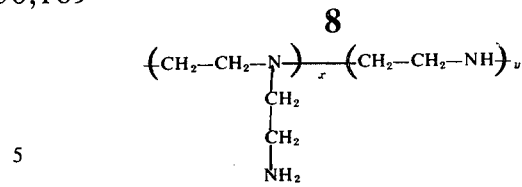

wherein $x$ and $y$ are 42.8 and 57.2 mole % respectively. A 10% by weight aqueous solution of this polyethyleneimine had an absolute viscosity at 25°C of 8.12 cP and its viscosity member $\eta_{sp}/c$ for a concentration c being 1 g/100 ml amounted to 0.215 dl/g.

30.39 g of N-trimethyl-N-glycidyl-ammonium chloride dissolved in 9 ml of water at room temperature were added dropwise in 90 seconds to the warm polyethyleneimine solution. These 30.39 g of N-trimethyl-N-glycidyl-ammonium chloride correspond to 0.2 mole of N-trimethyl-N-glycidyl ammonium chloride per mole of ethyleneimine in the polymer.

Although the heating was stopped, the temperature in the stirred reaction mixture continued to rise from 50° to 73°C as a result of the exothermic reaction between polyethyleneimine and the N-trimethyl-N-glycidyl-ammonium chloride.

The exothermic phase ceased after about 5 minutes. Thereafter the mixture was heated again under stirring to keep the mass at 70°C for 5 hours.

The viscous solution was diluted with 200 ml of water and from this solution the additional product of polyethyleneimine and N-trimethyl-glycidyl-ammonium chloride was isolated by the addition of 1 l of acetone while stirring.

The aqueous acetone solution was decanted and the tacky residue was washed with 0.5 l of acetone, dissolved in water and this solution diluted with sufficient water to obtain 350 ml of solution.

Yield: 73 g of modified polyethyleneimine.

It should be kept in mind that these polymers, as a result of their hygroscopicity, at the conditions in which they were dried still contain about 10% by weight of water.

EXAMPLES 2–10

The process of Example 1 was repeated with the same quantity of polyethyleneimine as starting material and quantities of N-trimethyl-N-glycidyl-ammonium chloride (GAC) varying between 0.1 and 1 mole of ethyleneimine (EI) in the polymer. The results of these processes and of that of Example 1 can be found in the following table.

| Modified polyethylenecimine Example | mole of GAC per mole of EI | g of GAC in ml of water per 43 g of polyethyleneimine | addition in minutes | yield of modified polymer in g* |
| --- | --- | --- | --- | --- |
| 2 | 0.1 | 15.15 g in 4.5 ml | 1 | 58 |
| 1 | 0.2 | 30.39 g in 4 ml | 1½ | 73 |
| 3 | 0.3 | 45.45 g in 13.5 ml | 2 | 88 |
| 4 | 0.4 | 60.6 g in 18 ml | 5 | 102 |
| 5 | 0.5 | 75.75 g in 22.5 ml | 15 | 118.5 |
| 6 | 0.6 | 90.9 g in 27 ml | 17 | 114 |
| 7 | 0.7 | 106.1 g in 31.5 ml | 40 | 149 |
| 8 | 0.8 | 121.2 g in 36 ml | 47 | 164 |
| 9 | 0.9 | 136.4 g in 40.5 ml | 35 | 179 |
| 10 | 1.0 | 151.5 g in 45 ml | 37 | 194 |

*as indicated in Example 1, the hygroscopicity of the modified polymers is very high and in these figures about 10 % by weight of water is included, even after drying of the modified polymers under reduced pressure to constant weight and in the presence of phosphorus pentoxide.

The modified polyethyleneimines of Examples 1, 3, and 9 were analysed. The following results were found.

| Example | mole of GAC per mole of EI | Analytical results | | | | mole % substitution in polyethylenemine |
|---|---|---|---|---|---|---|
| | | % Cl | % C | % H | % N | |
| 1 | 0.20 | 7.86 | 49.75 | 11.95 | 21.20 | 17.7 |
| 3 | 0.30 | 10.05 | 48.8 | 12.0 | 19.2 | 26.2 |
| 9 | 0.90 | 16.8 | 45.5 | 11.4 | 13.25 | 89 |

This proves that in the amino-alkylation of the polyethyleneimine an almost quantitative modification of primary and secondary amino groups occurs.

Aqueous solutions of the amino-alkylated polyethylene imines of Examples 1–10 were applied to a paper support. The coatings were dried and the surface resistance values of the different layers were measured as indicated above. The following results were found. For comparison the surface resistance of uncoated paper and of paper coated with unmodified polyethyleneimine are given also.

tion degree of the primary and secondary amino groups together was 46.5 mole %.

When 2.0 g/sq.m of the thus amino-alkylated polyethyleneimine was applied from aqueous solution on a paper base, the layer dried, and the surface resistivity of this layer was measured at 20°C, the following results were obtained:

at 50% of relative humidity: 1,770 × $10^6$ ohm/sq.
at 70% of relative humidity: 101 × $10^6$ ohm/sq.

It is interesting to compare these figures with those mentioned in Example 5. There we had for the same amount of modified polyethyleneimine per sq.m of paper:

| | mole of GAC per mole of EI | Polymer per sq.m of paper in g | Surface resistance in $10^6$ ohm/sq. at 20°C and relative humidity | | |
|---|---|---|---|---|---|
| | | | 15 % | 50 % | 70 % |
| Uncoated paper | 0 | 0 | >42,000,000 | 21,300 | 530 |
| Paper coated with unmodified polyethyleneimine | | 2.0 | >42,500,000 | 21,500 | 193 |
| | | 1.5* | >42,600,000 | 71,000 | 386 |
| Paper coated with polymer of Example | | | | | |
| 2 | 0.1 | 2.0 | 95,000 | 820 | 19.3 |
| | | 1.5* | 425,000 | 3,540 | 35.4 |
| 1 | 0.2 | 2.0 | 28,300 | 354 | 3.86 |
| | | 1.5* | 35,400 | 710 | 9.7 |
| 3 | 0.3 | 2.0 | 3,040 | 68 | 4.72 |
| | | 1.5* | 5,300 | 152 | 2.36 |
| 4 | 0.4 | 2.0 | 850 | 42.5 | 2.83 |
| | | 1.5* | 1,180 | 89 | 2.36 |
| 5 | 0.5 | 2.0 | 530 | 18.5 | 1.18 |
| | | 1.5* | 1,520 | 53 | 2.13 |
| 6 | 0.6 | 2.0 | 386 | 25 | 1.43 | with 5.6 liters of dichloroethane and then mixed with 4.2 kg of zinc oxide. The copolymer of vinyl acetate and dibutyl maleate comprises approximately 71% by weight of vinyl acetate, 29% by weight of dibutyl maleate and approximately 0.5 m.eq. of acetic groups.

The zinc oxide used is marketed by The Durham Chemical Group, Birtley, United Kingdom, under the trade name ELECTROX. The resulting dispersion is ground in a sand mill and then admixed with 1.2 liter of the same copolymer of vinyl acetate and dibutyl maleate, 1.5 liter of dichloroethane and 67 ml of a 1% ethanolic solution of bromophenol blue, with stirring. The dispersion is applied by means of a knife coater at a ratio of 30 g of zinc oxide per sq.m, and dried.

The material is then treated in a common electrophotographic copying apparatus. If the quality of copies made at different relative humidities is compared, only small differences can be observed. All copies had a good definition.

For comparison a same electrophotographic material was composed, with the difference, however, that the electroconductive layer of amino-alkylated polyethyleneimine was replaced by a layer of unmodified polyethyleneimine. The quality of the copy obtained at relative humidity of 15% and at 20°C was much poorer.

EXAMPLE 13

A baryta-coated photographic paper was covered with an aqueous solution of the amino-alkylated polyethyleneimine of example 10 at a ratio of 2 g/sq.m (weight of dried material).

The zinc oxide dispersion was then prepared as follows. First 20 g of the copolymer of vinyl acetate and vinyl stearate (85:15 mole %) were dissolved in 500 ml of ethanol. Then 225 g of photoconductive zinc oxide were added. The resulting mass was ground for 24 hours in a ball mill. Subsequently the following compounds were added with stirring:

| | |
|---|---|
| 2 % by weight solution of the copolymer of vinyl acetate and vinyl stearate (85:15 mole %) in ethanol | 500 ml |
| 10 % by weight solution of monobutyl-dihydrogen phosphate in ethanol | 10 ml |
| 10 % solution of succinic acid in dimethylformamide | 10 ml |
| 1 % solution of fluoresceine (Colour Index 43,350) in ethanol | 10 ml |

The resulting dispersion was coated on the electroconductive layer at a ratio of 26 g of zinc oxide per sq.m, and dried at 35°C.

The resulting material was charged negatively and exposed while in contact with a positive text original.

A grooved roller rotating in a 2% by weight aqueous solution of methylene blue was used as developing apparatus. A jockey roller pressed the exposed material against the grooved roller, which was driven at a speed of 4 cm/sec.

A clearly legible and sharp positive copy of the original was obtained.

EXAMPLE 14

A paper of 60 g/sq.m was impregnated with the amino alkylated polyethyleneimine of example 10. An aqueous dispersion was then made of 100 g of titanium dioxide, 50 g of starch and 150 g of the same amino-alkylated polyethyleneimine. This dispersion was then applied to both sides of the impregnated paper at a ratio of 4 g of solid substance per sq.m. of one side.

50 g of polyvinyl-butyral comprising in addition to the vinyl-butyral groups approximately 10% of vinyl alcohol groups and approximately 2% of vinyl acetate groups were dissolved in 500 ml of ethanol whereto 25 g of barium sulfate were added with thorough stirring. The resulting mixture was ground for 24 hours in a ball mill. The pigment dispersion was then applied to one side of the pretreated paper support at a ratio of 8 g of solid substance per sq.m.

The resulting material can be used for recording intermittent electric charges by means of a series of pins and then developed by means of an electrophoretic developer. When treated in an electrostatic recorder this material offers excellent results even at high recording rates.

EXAMPLE 15

An amino-alkylated polyethyleneimine was prepared according to the method described in Example 1. The quantities of reactants, however, were chosen so that an aminoalkylated polyethyleneimine was formed containing 0.66 mole of N-trimethyl-N-glycidyl-ammonium chloride per mole of ethyleneimine in the polymer.

Three strips of polyethylene terephthalate films of 100 micron were provided with a known subbing layer combination such as described in the United Kingdom Pat. Specification No. 1,234,755 filed 28.9.67 by Gevaert-Agfa N.V. The three subbed strips were coated with the following compositions:

| | Strip 1 | Strip 2 | Strip 3 |
|---|---|---|---|
| water | 87.2 g | 82.2 g | 89.7 g |
| gelatin | 3.8 g | 3.8 g | 3.8 g |
| modified polyethyleneimine 20 % aqueous solution | 2.6 g | 5.2 g | 1.3 g |
| of formaldehyde | 1.5 g | 1.5 g | 1.5 g |
| saponine | 2.5 g | 2.5 g | 2.5 g |

These coatings were applied in such a ratio that in the three strips after drying 2 g of gelatin per sq.m. were present.

The following surface resistance values of these layers were measured.

| | Surface resistance at 20°C in $10^6$ ohm/sq. | | |
|---|---|---|---|
| | at 15 % RH | at 50 % RH | at 70 % RH |
| Strip 1 | 4,250,000 | 2130 | 30.4 |
| Strip 2 | 13,300 | 82 | 10.6 |
| Strip 3 | 8,500,000 | 7100 | 9.3 |

An electrophotographic recording material was prepared by coating the electroconductive strip 2 with a solution consisting of:

| | |
|---|---|
| methylene chloride | 45 ml |
| 1,2-dichloroethane | 45 ml |

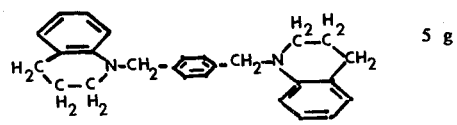 5 g

-continued

| | |
|---|---|
| copoly(vinyl chloride/vinyl acetate/ maleic anhydride) (mole ratio 86.5/ 13.3/0.2) | 5 g |
| Rhodamine B (C.I. Basic violet 10) (C.I. 45,170) | 0.025 g |

The dried recording layer containing approximately 3 g of photoconductor per sq.m was charged with a negative corona and exposed through an original while in contact therewith with 100 lux.sec. for 6 sec with a tungsten filament lamp. The latent image was developed electrophoretically for 5 sec with a developer prepared by diluting the concentrated developer composition described hereinafter in a volume ratio of 15/1000 by means of ISOPAR H (an isoparaffinic hydrocarbon mixture having a boiling range of 177°–188°C sold by Esso Belgium N.V., Antwerp, Belgium):

| | |
|---|---|
| carbon black (average particle size : 20 nm) | 30 g |
| zinc monotridecyl phosphate as dispersing agent | 1.5 g |
| ISOPAR H (trade name) | 750 ml |
| resin solution as described hereinafter | 150 g |

The resin binder solution was prepared by heating 500 g of ALKYDAL L 67 (of Farbenfabriken Bayer A. G., Leverkusen, W. Germany, for an alkyd resin modified with 67% by weight of linseed oil) and 500 ml of white spirit containing 11% by weight of aromatic compounds at 60°C until a clear solution was obtained, and subsequent cooling.

A good transparent copy of the original was obtained.

We claim:

1. An electrophotographic recording material comprising a support of paper or synthetic polymer and an electroconductive layer coated on at least one side of said support, said electroconductive layer having a surface resistance measured at 15 percent of relative humidity lower than $10^{11}$ ohm/sq., said electroconductive layer consisting of or including a major proportion of a water-soluble polymer resulting from the aminoalkylation of polyethylene imine with an epoxy compound bearing a quaternary ammonium end group, according to the general formula:

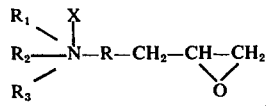

wherein: R represents a branched or unbranched alkylene group having up to 4 carbon atoms, each of $R_1$, $R_2$, and $R_3$ (same or different) represents an alkyl group containing up to 4 carbon atoms, a cycloalkyl group or an aralkyl group, or wherein $R_1$, $R_2$, and $R_3$ together with the nitrogen atom represent an heterocyclic amine group, and X is an anion, wherein a photoconductive layer is applied to the electroconductive layer.

2. An electrophotographic recording material according to claim 1, wherein said epoxy compound bearing a quaternary ammonium end group is obtained by making an epoxy compound of the formula:

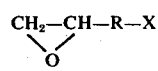

react with a tertiary amine of the formula:

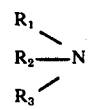

wherein: R represents a branched or unbranched alkylene group having up to 4 carbon atoms, each of $R_1$, $R_2$, and $R_3$ (same or different) represents an alkyl group containing up to 4 carbon atoms, a cycloalkyl group or an aralkyl group, or wherein $R_1$, $R_2$, and $R_3$ together with the nitrogen atom represent an heterocyclic amine group, and X is an anion.

3. An electrophotographic recording material according to claim 2, wherein said epoxy compound bearing a quaternary ammonium compound is N-trimethyl-N-glycidyl ammonium chloride obtained by making epichlorohydrin react with trimethylamine.

4. An electrophotographic recording material according to claim 1, wherein the electroconductive layer is formed of 0.5 to 7.5 g/sq. m of said aminoalkylated polyethylene imine.

* * * * *